(12) United States Patent
Bik (10) Patent No.: US 11,077,783 B2
(45) Date of Patent: Aug. 3, 2021

(54) ELECTROMAGNETIC DEVICE FOR SECURING AND COVERING CARGO

(71) Applicant: Waclaw Bik, Prineville, OR (US)

(72) Inventor: Waclaw Bik, Prineville, OR (US)

( * ) Notice: Subject to any disclaimer, the term of this patent is extended or adjusted under 35 U.S.C. 154(b) by 296 days.

(21) Appl. No.: 16/372,281

(22) Filed: Apr. 1, 2019

(65) Prior Publication Data

US 2019/0299841 A1 Oct. 3, 2019

Related U.S. Application Data

(60) Provisional application No. 62/651,513, filed on Apr. 2, 2018.

(51) Int. Cl.
*B60P 7/08* (2006.01)

(52) U.S. Cl.
CPC .................. *B60P 7/0876* (2013.01)

(58) Field of Classification Search
CPC ..................................... B60P 7/0876
USPC ......................................... 410/96
See application file for complete search history.

(56) References Cited

U.S. PATENT DOCUMENTS

| | | | | |
|---|---|---|---|---|
| 5,716,176 A | * | 2/1998 | Anderson | B60P 7/0876 296/100.16 |
| 6,851,903 B1 | * | 2/2005 | Foggy | B60P 7/0876 410/118 |
| 8,292,559 B1 | * | 10/2012 | Foggy | B60P 7/0876 410/96 |
| 8,857,887 B1 | * | 10/2014 | Schmeichel | B60J 7/104 296/100.18 |
| 9,868,382 B2 | * | 1/2018 | Aghili | B60R 11/06 |
| 2006/0243767 A1 | * | 11/2006 | McMillan | B60R 9/04 224/318 |
| 2007/0044646 A1 | * | 3/2007 | Smiley | F41H 7/04 89/36.07 |
| 2010/0019529 A1 | * | 1/2010 | Alston | B60J 7/141 296/100.09 |
| 2011/0265684 A1 | * | 11/2011 | Knight | B61D 39/001 105/377.06 |
| 2015/0147519 A1 | * | 5/2015 | Siegel | B60J 7/10 428/99 |
| 2015/0237938 A1 | * | 8/2015 | O'Neill | B60P 7/0823 2/322 |
| 2018/0170164 A1 | * | 6/2018 | Wingard | B32B 3/08 |

FOREIGN PATENT DOCUMENTS

| | | | | |
|---|---|---|---|---|
| GB | 2399060 A | * | 9/2004 | ............. B60R 25/00 |
| WO | WO-2012135069 A1 | * | 10/2012 | ............. B60P 7/0876 |
| WO | WO-2020082335 A1 | * | 4/2020 | |

* cited by examiner

*Primary Examiner* — Hilary L Gutman
(74) *Attorney, Agent, or Firm* — Stoel Rives LLP (57) ABSTRACT

An electromagnetic cover for securing cargo, the cover including a plurality of support members arranged to form a support structure. The electromagnetic cover includes a plurality of electromagnets coupled to the support members, the electromagnets being electrically coupled to a power source. When the power source is activated, the electromagnets generate a magnetic field to magnetically couple the cover to a surface to secure the cargo. Upon deactivating the power source, the electromagnetic cover can be removed to provide access to the cargo.

20 Claims, 6 Drawing Sheets fig.1

ELECTROMAGNETIC DEVICE FOR SECURING AND COVERING CARGO

RELATED APPLICATIONS DATA

This application is a nonprovisional of and claims the benefit under 35 U.S.C. § 119(e) of U.S. Provisional Patent Application No. 62/651,513 filed Apr. 2, 2018, the disclosure of which is incorporated by reference herein in its entirety.

TECHNICAL FIELD

The field of the present disclosure relates generally to devices for securing and covering cargo, such as cargo nets and tarpaulins, and in particular, to such devices including electromagnetic components for quickly and easily deploying the device around and over cargo to firmly secure the cargo against a vehicle bed prior to transport.

BACKGROUND

In our modern society, many different types of vehicles may be used to transport cargo from one location to another. For example, such vehicles can include pickup trucks, commercial trucks, trailers, boats, sports utility vehicles and military vehicles, each include designated regions for storing and transporting cargo. Typically, such cargo is secured to protect the cargo during transport and to reduce the risk that some or all of the cargo may blow or fall onto the road.

Many different approaches are used to secure and cover cargo in any suitable vehicle. For example, one common approach is to cover the cargo with a canvas tarpaulin that may be attached to the vehicle via any one of a variety of hooks, ropes, straps, and/or cords for securement. One common issue with tarpaulins is that during transport, wind will become trapped underneath the tarpaulin and will tend to pull the tarpaulin away from the cargo and the vehicle. The inflated tarpaulin may impact visibility for the driver, or may allow smaller objects in the cargo to blow away from the vehicle. In some instances, the tarpaulin may be completely pulled away from the vehicle, thereby leaving the cargo exposed. In addition to potential damage that may be caused to the cargo by exposure to the environment, the cargo itself may cause damage if it falls onto the road, and/or the loose tarpaulin may be a hazard if it becomes lodged against a vehicle windshield and blocks a driver's view.

Another common approach is to use a cargo net to secure cargo in a vehicle. A conventional cargo net is made of elastic or inelastic webbing that is crisscrossed or looped together. Due to the design of the cargo net, air readily moves through the material, thereby avoiding many of the issues described above that impact tarpaulins. A cargo net is typically tied down onto the vehicle or fastened to hooks or other attachments included in the vehicle. While the cargo net may avoid some of the disadvantages of a conventional tarpaulin, the cargo net itself also has certain limitations.

For example, one common issue with using cargo nets is that it may be difficult to conform the cargo net to the cargo being carried due to the fixed attachment or anchor points on the vehicle bed for the net. For instance, the various objects comprising the cargo may have different shapes and sizes, or a singular cargo item may not have uniform sides or edges. Accordingly, a cargo net that is stretched across the cargo from one side of the truck to the other may not be sufficiently taut so as to properly compact the load against the vehicle thereby allowing certain objects to slide or move around during transport. In other instances, the cargo net may be overly taut such that it may damage the cargo or lead to a rupture of the cargo net itself.

Accordingly, the present inventor has determined that it would be desirable to develop a device that is quickly and easily deployable for covering and firmly securing cargo against a vehicle bed and accommodating a diverse size range of loads. The present inventor has also determined that it would be desirable for such a device to include electromagnetic components that can be quickly activated to firmly secure large loads to a vehicle, and also quickly deactivated to remove the device and access the cargo upon reaching a target destination. Additional aspects and advantages will be apparent from the following detailed description of example embodiments, which proceeds with reference to the accompanying drawings. It should be understood that the drawings depict only certain example embodiments and are not to be considered as limiting in nature.

DETAILED DESCRIPTION OF EXAMPLE EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or otherwise described in detail to avoid obscuring more pertinent aspects of the embodiments.

With reference to the figures, the following disclosure relates generally to a cargo-securing device including electromagnetic components for covering and firmly securing cargo onto the bed of a vehicle for transport. In some embodiments, the cargo-securing device may resemble the design of a cargo net formed from ferromagnetic cables and electromagnets, where the net may be activated and deactivated by controlling the supply of electricity. When activated, the electromagnets allow the cargo net to magnetically couple to the bed or base of the vehicle to securely retain the cargo. If the cargo also includes or comprises ferromagnetic material, the cargo net will also magnetically couple to the cargo itself via one or more of the electromagnets, thereby increasing the cargo surface contact of the cargo net and further securing the cargo in position during transport. As further described in detail below, the electromagnetic cargo net is wind resistant and is designed to avoid the use of anchors, fasteners, hooks, or other attachment devices to physically secure the cargo net to the bed or base of the vehicle.

In another embodiment, the cargo-securing device may resemble a conventional tarpaulin having a solid cover that may help protect cargo from water, sun, and other environmental variable. Similar to the cargo net embodiment, the tarpaulin may include a plurality of electromagnets distributed within an interior layer of the tarpaulin, where the electromagnets may be activated to magnetically couple the tarpaulin to the vehicle bed. It should be understood that while the figures and corresponding description below may be made with reference to deployment of the cargo-securing device in pickup trucks or similar trucks with a bed, the disclosure may be adapted to apply to any cargo-carrying vehicle or vessel, such as commercial trucks, boats, planes, military vehicles, and other suitable cargo carriers. Additional details of these and other embodiments are further discussed below with particular reference to the accompanying figures.

Figure 1:
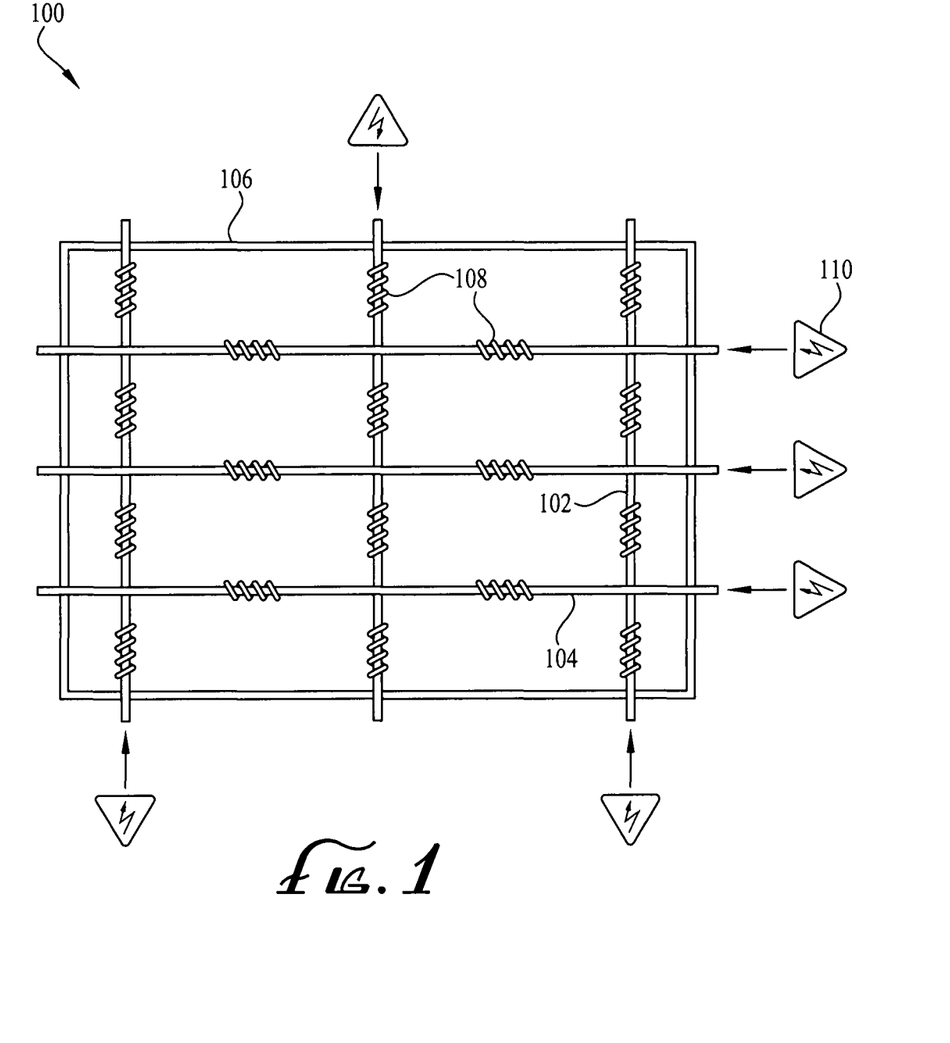
FIG. 1 is a schematic illustration of an electromagnetic cargo net in accordance with one embodiment.

FIG. 1 is a schematic illustration of an electromagnetic cargo net 100 in accordance with one embodiment. With reference to FIG. 1, the cargo net 100 is a generally metallic lattice structure including a plurality of longitudinal ferromagnetic cables 102 arranged generally parallel to another and a plurality of transverse ferromagnetic cables 104 arranged orthogonally to and extending across the longitudinal ferromagnetic cables 102. The cargo net 100 may include any number of cables 102, 104 to create a sufficiently large net as desired. The ends of the cables 102, 104 are each affixed to a net frame 106 that is also made of a ferromagnetic material. The cables 102, 104 may be attached to the net frame 106 via any suitable fastener, such as grommets and rivets, or may be attached via other suitable methods, such as welding. Similarly, where one of the ferromagnetic cables 102 crosses one of the ferromagnetic cables 104, the cables 102, 104 may be affixed via grommets, rivets, or a weld to form a crisscrossing lattice structure.

The electromagnetic cargo net 100 further includes a plurality of electromagnets 108, which consist of a length of conductive wire wound into a coil and wrapped around portions of the ferromagnetic cables 102, 104. To operate the electromagnets 108, a battery or other power source 110 introduces a current to the conductive wire, the current flowing through the wire of the electromagnets 108. The current flow creates a magnetic field around the coiled wire, which magnetizes the metal as if it were a permanent magnet and allows the electromagnetic cargo net 100 to magnetically couple the cargo to the vehicle bed as further described in detail below.

In an example operation, cargo is loaded onto a cargo area of a vehicle. In this example, a standard pickup truck bed will be used for easy reference, understanding that other beds or cargo carriers may be used in other embodiments. Once the cargo has been loaded on the truck bed, the electromagnetic cargo net 100 may be positioned over the cargo and arranged as desired until all cargo is underneath the cargo net 100 as desired. Once the cargo net 100 has been deployed and arranged over the cargo, the power source 110 is activated to energize the electromagnets 108. Once the electromagnets 108 are energized, the magnetic fields created by the current will magnetize the ferromagnetic cables 102, 104 and cause the cargo net 100 to magnetically couple to the truck bed. Moreover, if some or all of the cargo is ferromagnetic, the cargo net 100 will magnetically couple to the cargo as well, as mentioned previously. As long as the current is supplied, the cargo net 100 will remain magnetically attached to the truck bed and the cargo during transport. In some embodiments, the cargo net 100 may further include attachment means, such as hooks or other fasteners, to further secure the cargo net 100 to the truck bed in the event of a power failure of the power source 110. Upon reaching the destination, the power supply 110 may be deactivated, which in turn will cause the magnetic field to disappear and allow the cargo net 100 to be effortlessly removed from the cargo in a similar fashion as a conventional cargo net made of webbing or other similar materials.

In the embodiment described above, the cargo net 100 may be a standalone device that can be magnetically coupled and decoupled from the truck bed as desired. In other embodiments, the cargo net 100 may be deployable in a different fashion, such as the deployment system described with reference to FIG. 2.

Figure 2:
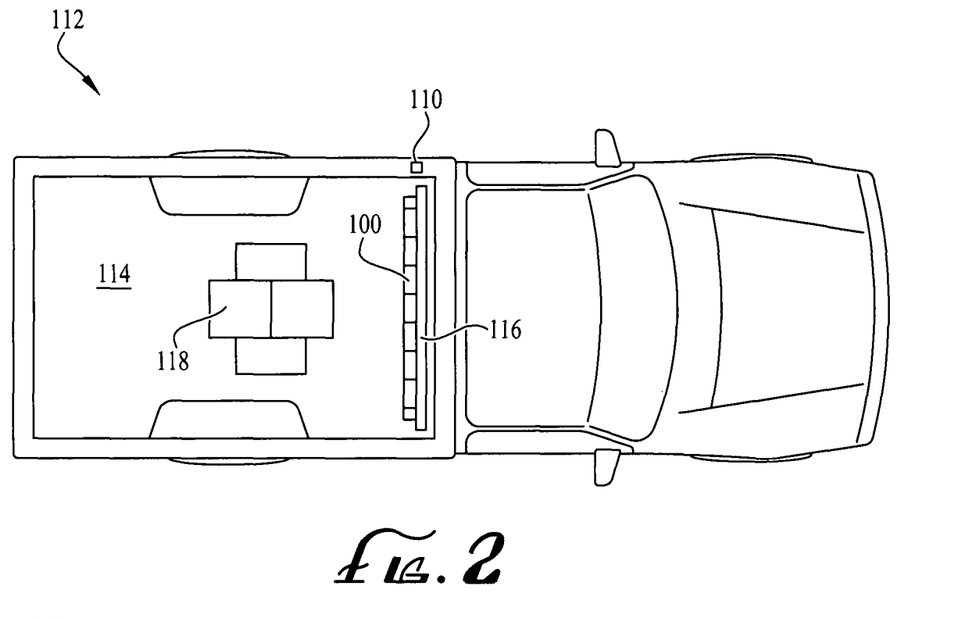
FIG. 2 is a schematic illustration of a vehicle including the electromagnetic cargo net of FIG. 1 for securing cargo on the vehicle.

FIG. 2 is a schematic illustration of a rear portion of a vehicle 112 that may be used in conjunction with the electromagnetic cargo net 100 described previously. With reference to FIG. 2, the vehicle 112 includes a substantially flat truck bed 114 located on a rear portion of the vehicle 112 that may be used to carry cargo 118. The vehicle 112 further includes a roller mechanism 116 affixed thereto adjacent the truck bed 114, where the cargo net 100 is arranged in a rolled up configuration and deployable via the roller mechanism 116. The roller mechanism 116 may further accommodate the wiring from the power source 110 so that the wiring extends from the power source 110 through the roller mechanism 116 to power the electromagnetic cargo net 100. In some embodiments, the power source 110 may be embedded or integrated with the roller mechanism 116 such that a separate power source may not be needed.

In an example operation, the cargo net 100 may be deployed from the roller mechanism 116 by pulling the cargo net 100 out of the end of the roller mechanism 116. As the cargo net 100 is pulled, the cargo net 100 unrolls from the roller mechanism 116 and is extended across and over the cargo 118 on the truck bed 114. When ready to secure the cargo 118, the power source 110 may be activated to energize the electromagnetic cargo net 100 in a similar fashion as described previously.

Figure 3:
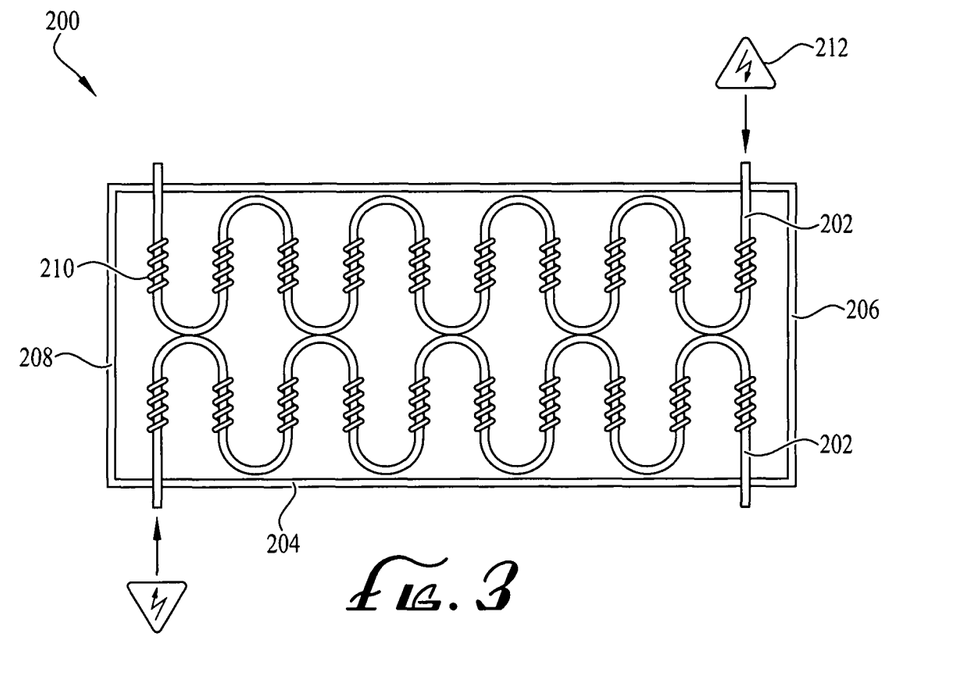
FIG. 3 is a schematic illustration of an electromagnetic cargo net in accordance with another embodiment.

It should be understood that one having ordinary skill in the art will readily recognize that the cargo net may be constructed with ferromagnetic cables arranged in any one of a variety of patterns. For example, in one embodiment, the cargo net may include the cables arranged in a generally hexagonal arrangement as in a conventional cargo net. In other embodiments, the cables may be arranged in a different manner. For example, FIG. 3 is a schematic illustration of an electromagnetic cargo net 200 in accordance with another embodiment. With reference to FIG. 3, the cargo net 200 may include ferromagnetic cables 202 arranged in a generally serpentine pattern extending across the net frame 204 from one peripheral edge 206 to another opposite peripheral edge 208. The cargo net 200 may include any number of serpentine-shaped coil layers to lengthen or vary the dimensions of the cargo net 200 as desired. In some embodiments, the respective layers may be affixed to one another via any suitable means, such as via grommets or rivets, or by welding. The ferromagnetic cables 202 include a plurality of electromagnets 210 arranged thereon, where the electromagnets 210 may be activated via a power supply 212. In a similar fashion as described previously with respect to the electromagnetic cargo net 100, the electromagnetic cargo net 200 may be deployed as a standalone unit or may be deployed via a roller mechanism (such as roller mechanism 116 described in FIG. 2).

Figure 4:
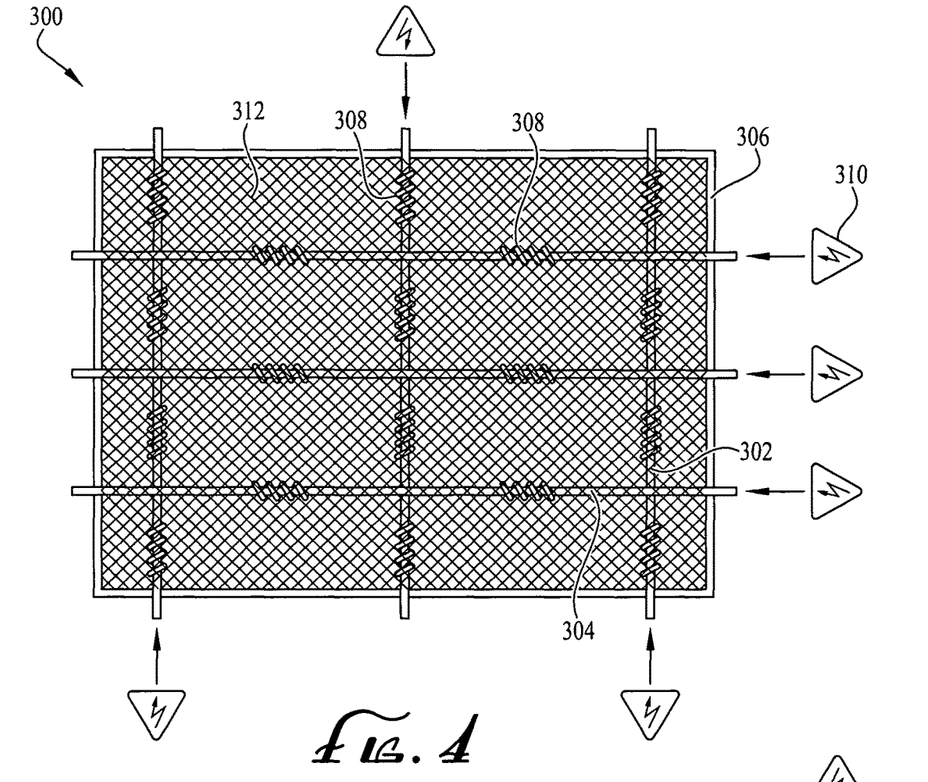
FIG. 4 is a schematic illustration of an electromagnetic tarpaulin in accordance with one embodiment.

While the prior embodiments described the cargo-securing device designed to resemble a conventional cargo net, the cargo-securing device may take any one of a variety of suitable designs. For example, with reference to FIG. 4, the cargo-securing device may be an electromagnetic tarpaulin 300 in accordance with one embodiment. With reference to FIG. 4, the electromagnetic tarpaulin 300 may include the same or similar features as the electromagnetic cargo nets 100, 200 described previously. Briefly, with reference to FIG. 4, the electromagnetic tarpaulin 300 includes a generally metallic lattice structure including a plurality of longitudinal ferromagnetic cables 302 arranged generally parallel to another and a plurality of transverse ferromagnetic cables 304 arranged orthogonally to and extending across the longitudinal ferromagnetic cables 302 in a similar arrangement as described previously with reference to FIG. 1. The ends of the cables 302, 304 are affixed via fasteners or a weld to a net frame 306 that is also made of a ferromagnetic material. A plurality of electromagnets 308 are arranged around the cables 302, 304 at spaced-out intervals as desired. The electromagnets 308 are coupled to a battery or power source 310 to create magnetic fields as described previously.

With reference to FIG. 4, the electromagnetic tarpaulin 300 includes a surface cover 312 attached to the net frame 306, where the surface cover 312 extends to the boundaries of the net frame 306 such that the cables 302, 304 and electromagnets 308 are fully enclosed within the surface cover 312. Preferably, the cover 312 fully encloses the cables 302, 304 and electromagnets 308 on a top side and on a bottom side of the electromagnetic tarpaulin 300. However, in other embodiments, the surface cover 312 may extend only on one side (e.g., on the top side facing away from the cargo) of the electromagnetic tarpaulin 300, with the bottom side of the electromagnetic tarpaulin 300 being open such that the ferromagnetic cables 302, 304 and electromagnets 308 may directly contact the cargo and/or truck bed.

The surface cover 312 may be formed of any one of a variety of suitable materials. For example, in one embodiment, the surface cover 312 may be a mesh/tarp fabric that is highly resistant to wear and that limits the potentially destructive effects of the outdoor environment, such as sun damage, water damage, and temperature damage. The mesh/tarp fabric may be made of polypropylene, nylon, polyester vinyl, or other suitable materials. In other embodiments, the surface cover 312 may be a canvas material to provide added weight and protection to the cargo, if needed. In still other embodiments, any suitable fabric material may be used as long as it does not hinder the operation of the electromagnets, and is preferably fire resistant/retardant to minimize the potential damage that may occur in the event that the power supply malfunctions.

Figure 5:
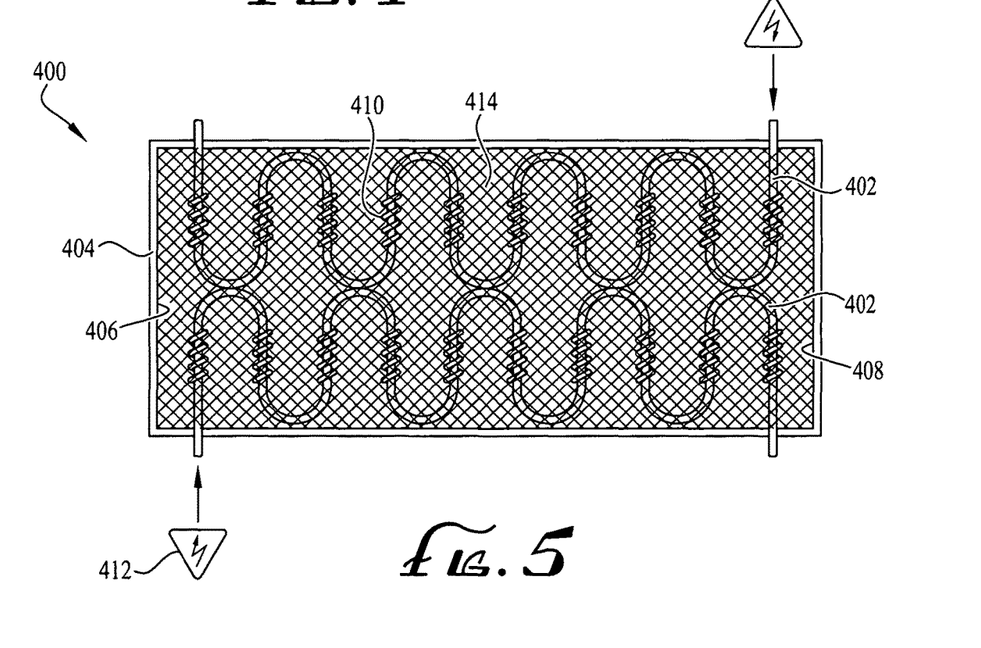
FIG. 5 is a schematic illustration of an electromagnetic tarpaulin in accordance with another embodiment.

FIG. 5 illustrates another embodiment of an electromagnetic tarpaulin 400, where the ferromagnetic cables 402 are arranged in a generally serpentine pattern extending across the net frame 404 from one edge 406 to another opposite edge 408 in a similar fashion as described with reference to FIG. 3. The electromagnetic tarpaulin 400 may include any number of serpentine-shaped coil layers to lengthen or vary the dimensions of the electromagnetic tarpaulin 400 as desired. The ferromagnetic cables 402 include a plurality of electromagnets 410 arranged thereon, where the electromagnets 410 may be activated via a power supply 412 as described previously. The electromagnetic tarpaulin 400 includes a surface cover 414 with similar features and characteristics as the surface cover 312 described previously with reference to FIG. 4.

Figure 6:
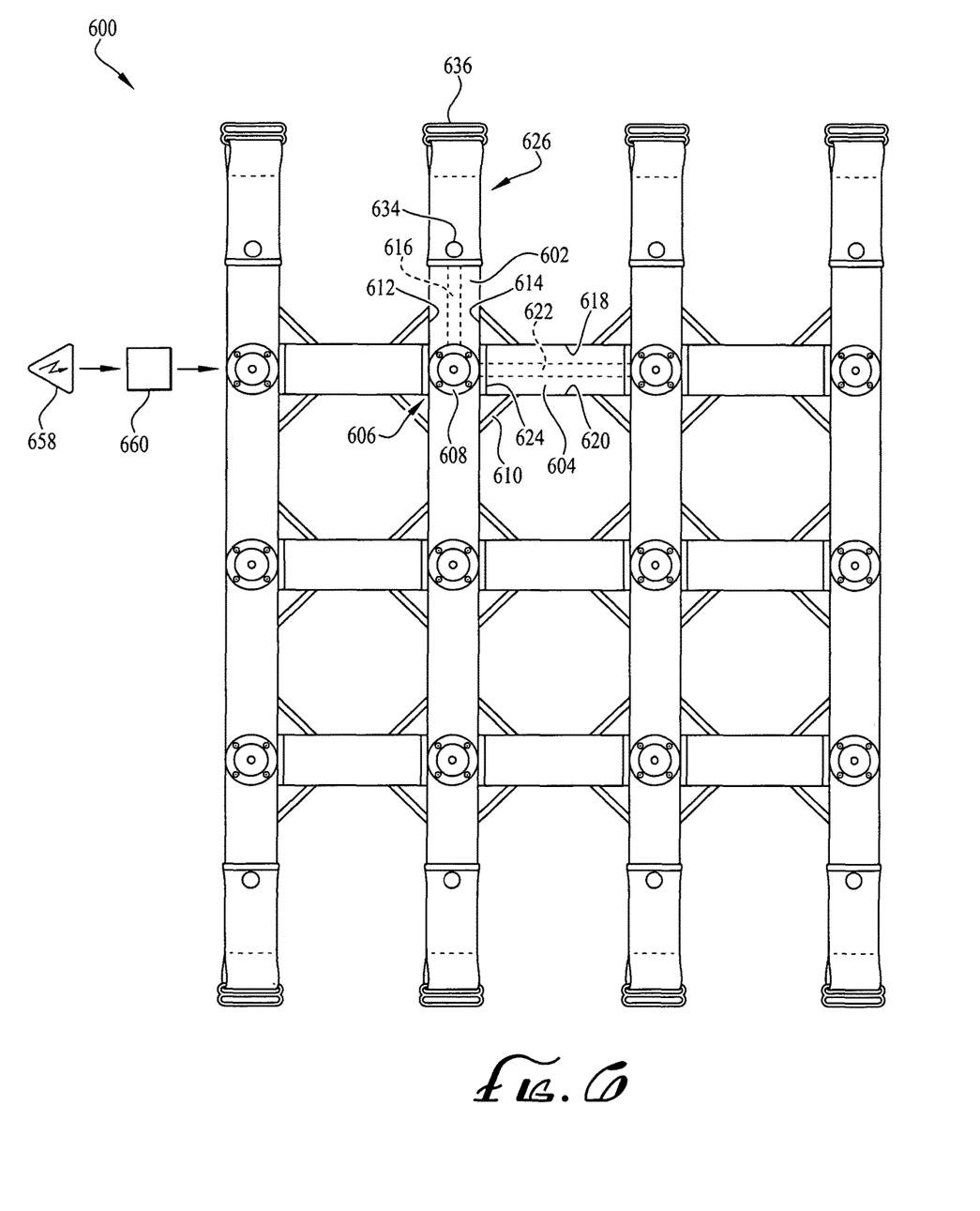
FIG. 6 is a schematic illustration of an electromagnetic cargo net in accordance with yet another embodiment.

FIGS. 6-10 collectively illustrate features of another embodiment of an electromagnetic cargo net 600 for securing and covering cargo. With particular reference to FIG. 6, the electromagnetic cargo net 600 is a lattice structure including a plurality of webbing members 602 extending along a generally vertical axis, where the webbing members 602 are offset and arranged generally parallel to one another relative to the vertical axis. The cargo net 600 further includes a plurality of webbing members 604 extending along a generally horizontal axis, where the webbing members 604 are offset and arranged generally parallel to one another relative to the horizontal axis. In this configuration, the webbing members 602, 604 cross one another at a junction 606, at which the webbing members 602, 604 may be affixed to one another via stitching, adhesives, or other suitable means. At each junction 606, the electromagnetic cargo net 600 includes an electromagnet 608. In some embodiments, the electromagnets 608 may be 20-lb electromagnets that provide sufficient strength to firmly secure the cargo net 600 around the cargo. In other embodiments, the electromagnets 608 may be have different strength characteristics as desired. Additional details relating to the electromagnets 608 are provided in further detail below.

In some embodiments, each longitudinal webbing member 602 may be formed as single, elongated lengths of webbing material, and the horizontal webbing members 604 may be formed as a number of strips of webbing material that are individually stitched or otherwise attached to the webbing members 602 at the junction 606, where a single strip of webbing material extends horizontally between adjacent junctions 606. In other embodiments, each of the webbing members 602, 604 may instead be formed of single, elongated lengths of webbing material that are stitched together to form the lattice structure. It should be understood that the cargo net 600 illustrated in FIG. 6 depicts one example arrangement. Other embodiments may include more or fewer webbing members 602, 604 arranged in a different configuration to create an electromagnetic cargo net 600 having a desired size.

As noted previously, each junction 606 of the electromagnetic cargo net 600 is designed to house a corresponding electromagnet 608. With reference to FIG. 6, the following provides details relating to the characteristics of the junction 606 for housing the electromagnet 608. It should be understood that the following discussion provides details of one example embodiment and is not intended to be limiting.

With reference to FIG. 6, each longitudinal webbing member 602 includes a plurality of openings (not shown) formed thereon, each opening extending entirely through the webbing member 602 from a top surface thereof through to a bottom surface. Each opening on the webbing member 602 is formed at a location corresponding to the location of a junction 606. The opening may be formed via any suitable method, such as by laser ablation, stamping, cutting, or other suitable techniques. Preferably, the opening is sized and dimensioned to receive and secure the electromagnet 608 therein. For example, in some embodiments, the electromagnet 608 may be housed in or supported by a circular casing, and the opening will similarly be circular in that embodiment. In other embodiments, the casing and corresponding opening may instead be rectangular, square, or any other suitable shape.

FIG. 6 illustrates an example embodiment showing a placement of an electromagnet 608 at each of the junctions 606 formed between the webbing members 602, 604. In other embodiments, not all junctions 606 may house an electromagnet 608. For example, in some embodiments, the electromagnetic cargo net 600 may incorporate electromagnets 608 in alternating junctions 606 instead of at every junction 606.

With reference to FIG. 6, in some embodiment, each junction 606 may include a reinforcing member 610 affixed to each of webbing members 602, 604 along various portions thereof, wherein the reinforcing member 610 provides additional strength and rigidity to the cargo net 600. The following provides additional details relating to one example stitching process for affixing the webbing members 602, 604 and the reinforcing member 610 together in such a fashion so as to create various internal pathways 616, 622 running within the webbing members 602, 604 to manage the wiring used to connect the electromagnets 608 to a battery 658.

With general reference to FIG. 6, the webbing member 602 includes a top webbing layer (shown in FIG. 6) and a bottom webbing layer (not shown) that are initially separate pieces of webbing material. To construct each webbing member 602, the top and bottom webbing layers are stitched together along their respective peripheral edges (e.g., a first lateral edge 612 and a second lateral edge 614) to create the longitudinal webbing member 602. In between the top and bottom webbing layers and bounded laterally by the stitched edges is a first internal pathway 616 extending between adjacent electromagnets 608 and along the entirety (or portion thereof) of the webbing member 602 along a vertical axis of the cargo net 600. The first internal pathway 616 may house wiring for powering and controlling the electromagnets 608.

At each junction 606, a first portion of the reinforcing members 610 is stitched between the top and bottom webbing layers to attach the reinforcing members 610 thereto, with a second portion of the reinforcing member 610 extending outwardly from the webbing member 602 to form a generally triangular shape. Thereafter, the top and bottom webbing layers of the transverse webbing member 604 are stitched together along their respective peripheral edges (e.g. a first lateral edge 618 and a second lateral edge 620) in a similar fashion as described above with reference to webbing member 602, and also stitched onto the reinforcing member 610 along the second portion extending from the webbing member 602. In a similar fashion as described previously, the stitched top and bottom layers of the webbing member 604 create a second internal pathway 622 between adjacent electromagnets 608 along a horizontal axis of the cargo net 600. Preferably, the ends of the webbing member 604 are not stitched or otherwise fixed, thereby leaving a tab or flap 624 adjacent the electromagnet 608 that can be lifted to expose the second internal pathway 622 and allow insertion of the wiring of the electromagnet 608. The flap 624 may also provide easy access to the internal wiring of any damaged electromagnet 608 as needed for repair.

It should be understood that the foregoing description provides details of one embodiment for stitching together webbing members to create internal pathways between the various webbing layers of the electromagnetic cargo net 600. In other embodiments, different stitching arrangements may be used to create the internal pathways for wiring as needed. It should also be understood that while FIG. 6 illustrates two internal pathways 616, 622, the electromagnetic cargo net 600 may include similar internal pathways 616, 622 within multiple or all webbing members 602, 604 to accommodate various electric circuit and wiring designs. For example, in one embodiment, all electromagnets 608 within each vertical webbing member 602 may be interconnected to one another, with one of the electromagnets 608 being connected (directly or indirectly) to the power source 658 to power all interconnected electromagnets 608. In such embodiments, the wiring for the electromagnets 608 is primarily housed in the webbing members 602. In other embodiments, the electromagnets 608 may instead be interconnected along the horizontal axis so that wiring is primarily housed within the horizontal webbing members 604. In still other embodiments, the wiring may be housed in both webbing members 602, 604 depending on the desired electrical circuit design.

Figure 7:
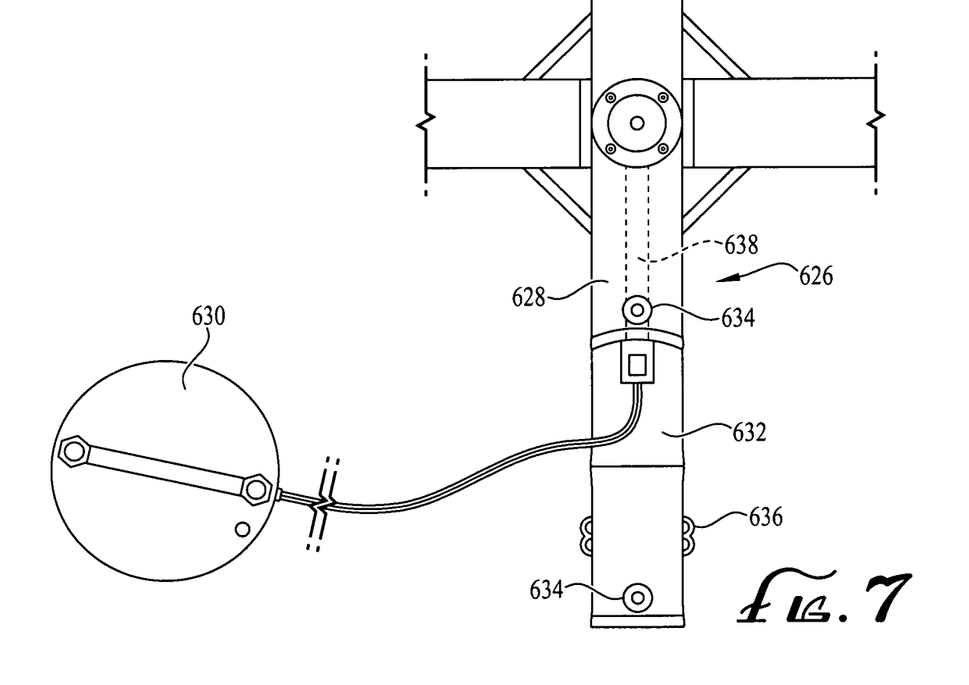
FIG. 7 is an enlarged view of a portion of the electromagnetic cargo net of FIG. 6, illustrating features of an end strap designed for accommodating an anchor magnet.

As illustrated in FIGS. 6 and 7, in some embodiments, the electromagnetic cargo net 600 may include end straps 626 positioned along the outermost edges of the cargo net 600, the ends straps 626 designed for receiving and securing an anchor magnet 630 thereto. Preferably, the anchor magnet 630 is an 80-lb to 110-lb electromagnet designed to firmly anchor the cargo net 600 in position and prevent its slippage or movement once powered. In other embodiments, the anchor magnet 630 may have different strength characteristics than the range provided, but it preferably is stronger than the electromagnet 608. The following section proceeds with additional details relating to the end strap 626 and its operation, and the anchor magnet 630.

With general reference to FIGS. 6 and 7, the end strap 626 includes a first webbing portion 628 and a second webbing portion 632. In the illustrated embodiment, the second webbing portion 628 includes a clasp 634 affixed thereto, the clasp 634 designed to removably couple the first and second webbing portions 626, 632 together. The second webbing portion 632 further includes a clip 636 coupled thereto, the clip 636 designed for coupling the anchor magnet 630 as further described below. When the first and second webbing portions 628, 632 are decoupled, an internal pathway 638 is revealed to house the electrical connector and wiring for the anchor magnet 630 when attached as further described with reference to FIGS. 8-10.

In other embodiments, the clasp 634 may be another suitable releasable lock mechanism for removably coupling the first and second webbing portions 626, 632 to one another. For example, the webbing portions 626, 632 may each incorporate mating portions of a hook-and-loop fastener instead of a clasp. In still other embodiments, other suitable connectors or mechanism may be substituted for the clasp 634 without departing from the principles of the disclosed subject matter.

Figure 8:
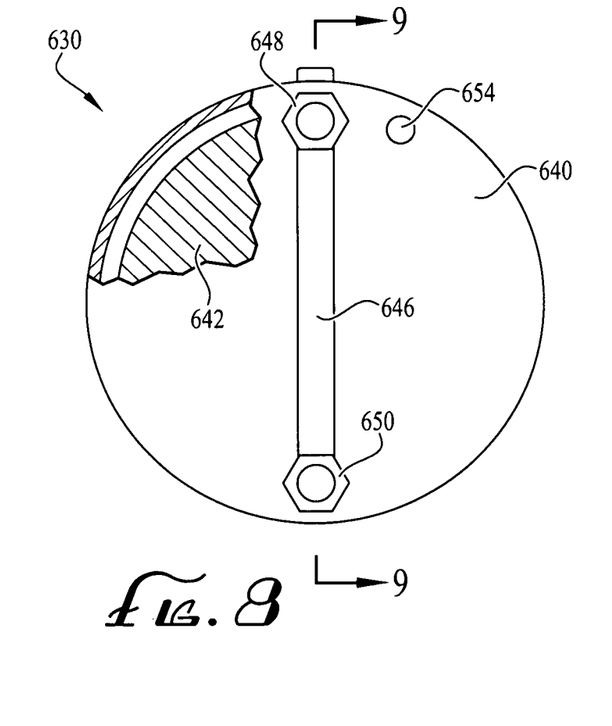
FIG. 8 is a schematic illustration of the anchor magnet of FIG. 7 in accordance with one embodiment.
Figure 9:
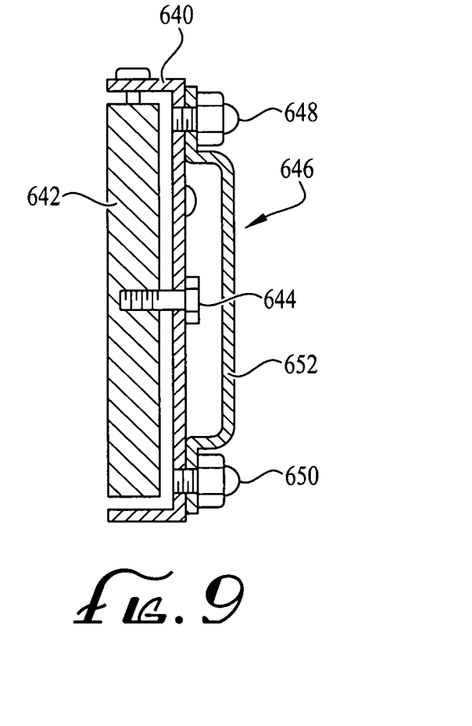
FIG. 9 is a cross-sectional view of the anchor magnet of FIG. 8.

FIGS. 8 and 9 collectively illustrate details of the anchor magnet 630 in accordance with one embodiment. With general reference to FIGS. 8 and 9, the anchor magnet 630 includes a housing 640 to which an electromagnet 642 is attached. In one embodiments, the electromagnet 642 may be attached via a connector or fastener 644 extending through the housing 640 and the electromagnet 642. In other embodiments, the electromagnet 642 may be coupled to the housing 640 via other suitable means. The housing 640 further includes a loop handle 646 having a first end 648 and a second end 650 affixed to the housing 640, the loop handle 646 including a portion 652 raised relative to the housing 640 and extending between the first and second ends 648, 650. As further described in detail with reference to FIG. 10, the loop handle 646 accommodates a portion of an anchor strap 656 to couple the anchor magnet 630 to the end strap 626. In some embodiments, the housing 640 may further include a voltage indicator light 654 to visually indicate the power state (e.g., on or off) of the cargo net 600.

Figure 10:
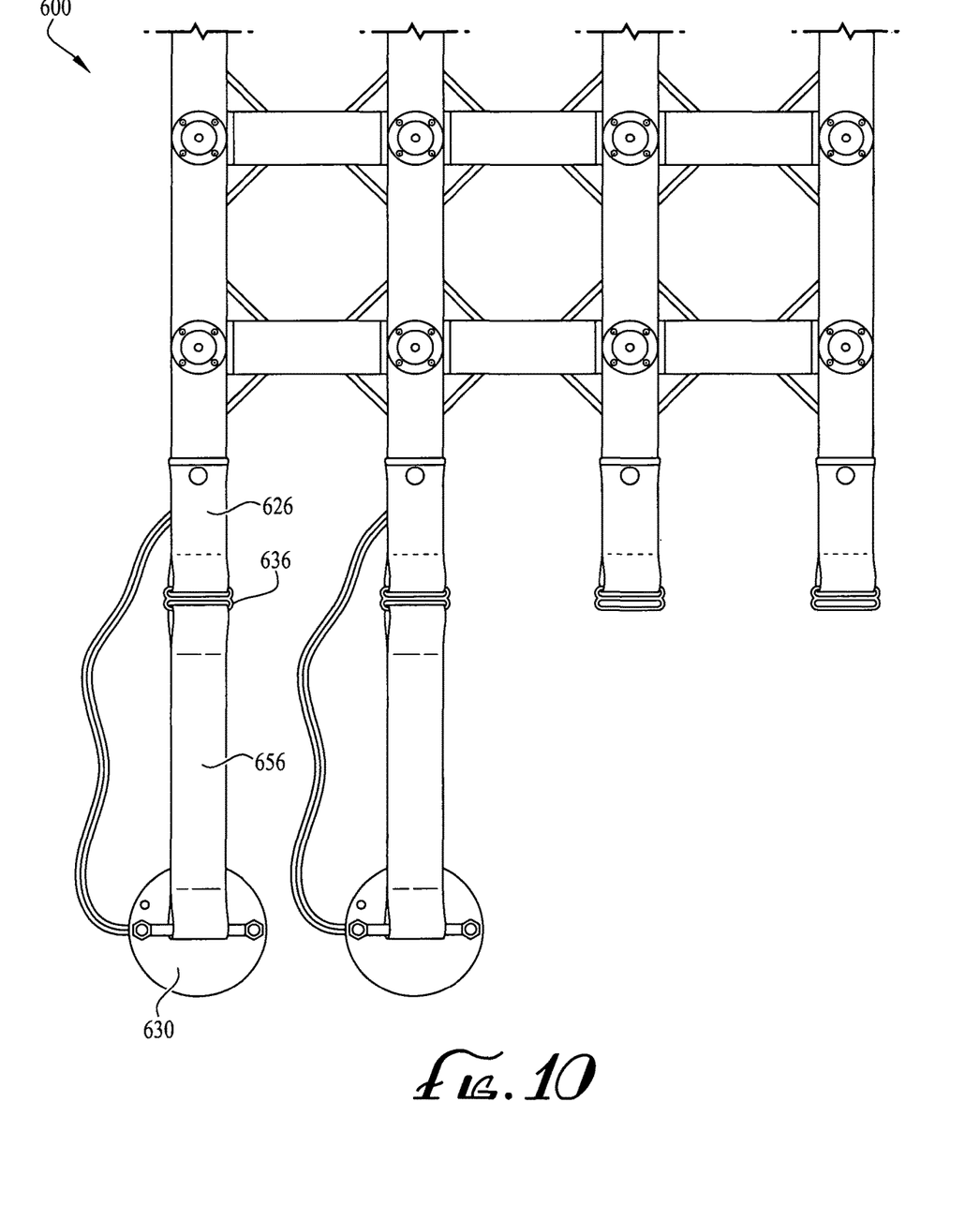
FIG. 10 illustrates the electromagnetic cargo net of FIG. 6 with the anchor magnet of FIGS. 8-9 coupled thereto.

FIG. 10 illustrates an example embodiment of the electromagnetic cargo net 600 having a pair of anchor magnets 630 coupled to the end straps 626. With collective reference to FIGS. 7 and 10, in one example attachment process, the anchor strap 656 is weaved through the clip 636 positioned on the end of the end strap 626 and also through the loop handle 646 of the anchor magnet 630. The anchor strap 656 may include hook-and-loop fasteners, clasps, or other suitable fastening mechanisms to secure the webbing material of the anchor strap 656 together at a desired length to position the anchor magnet 630 at a desired distance away from the end strap 626. Once the anchor magnet 630 is secured, the webbing portions 628, 632 of the end strap 626 may be decoupled to reveal the internal pathway 638 for accommodating the wiring of the anchor magnet 630. Once the wiring is arranged as desired, the webbing portions 628, 632 may be coupled again to ensure that the wiring remains in place.

The electromagnetic cargo net 600 may be powered with any suitable power source designed to provide appropriate voltage for activating the electromagnets 608 and anchor magnets 630. For example, in one embodiment, a battery 658 may be used to power the electromagnetic cargo net 600 (see FIG. 6). In some embodiments, the battery 658 may be connected to a voltage regulator 660 to ensure that consistent and regular voltage is fed through to the electromagnets 608 and the anchor magnets 630. As described previously, all wiring for the electromagnets 608 and anchor magnets 630 is preferably contained within the various pathways 616, 622 formed within the webbing members 602, 604 to minimize exposure of the wiring and to prevent the wiring from interfering with use of the electromagnetic cargo net 600. As noted previously, although FIG. 6 illustrates two pathways in particular (i.e., pathways 616, 622) for illustration purposes, it should be understood that the electromagnetic cargo net 600 may include any number of internal pathways interconnecting various of the electromagnets 608 and/or anchor magnets 630 in any suitable circuit design. For example, in some embodiments, the electromagnetic cargo net 600 may incorporate three or four separate electric circuits, each circuit supplying power to an interconnected subset of the electromagnets 608 and anchor magnets 630. In other embodiments, more of fewer electric circuits may be used.

In other embodiments, the electromagnetic cargo nets and tarpaulin designs described herein may be used to generate heat for maintaining adequate operating temperature for specific cargo. For example, the electromagnetic cargo nets and tarpaulin will generate heat over the course of their operation. The amount of heat generated depends on the size of the electromagnets and the voltage used for their operation. This heat will be dissipated into the cargo area to heat the cargo and the environment and avoid potential damage that may be caused by freezing exterior temperatures or other temperature changes. In such embodiments, the electromagnetic cargo nets and tarpaulin may incorporate a thermostat in communication with the battery to shut down power if the thermostat indicates the temperature in the cargo area exceeds a desired threshold point. Alternatively, other venting procedures may be employed in the cargo area to ensure that an appropriate temperature is maintained.

It should be understood that in other embodiments, the ferromagnetic cables and/or electromagnets described herein and illustrated in the figures may be positioned in any number of arrangements without departing from the principles of the disclosed subject matter. While the illustrations disclose various distinct arrangements for the ferromagnetic cables and/or electromagnets, one having ordinary skill in the art will readily understand that the arrangements may be varied as desired. For example, while the arrangements are generally illustrated with the electromagnets positioned at regular intervals, other embodiments may arranged the electromagnets differently.

It should also be understood that the electromagnetic tarpaulins 300, 400 may be used in the same or similar fashion as the electromagnetic cargo nets 100, 200 described previously. Accordingly, further detail regarding operation of the electromagnetic tarpaulin 300 is not described to avoid repetition and obscuring the pertinent details of the disclosed subject matter. In addition, it should be understood that the cargo net 600 described with reference to FIGS. 6-10 may be designed as a tarpaulin by incorporating a mesh or other covering over the electromagnets as described herein.

Many of the features and components described in the embodiments of FIGS. 1-10 are for illustration purposes and are not intended to be limiting. Accordingly, one having ordinary skill in the art may rearrange the features and components described herein in any of the embodiments without departing from the principles of the disclosure. In addition, it is intended that subject matter disclosed with particular reference to one figure can be combined with the subject matter of one or more other figures herein as long as such combinations are not mutually exclusive or inoperable. In addition, many variations, enhancements and modifications of the concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. An electromagnetic cover for securing cargo, the electromagnetic cover comprising:
   a plurality of first webbing members arranged generally parallel to one another, wherein each first webbing member of the plurality of first webbing members is offset from an adjacent first webbing member, wherein at least some of the first webbing members includes a first webbing laver and a second webbing layer coupled to one another to form an internal pathway extending therethrough;
   a plurality of second webbing members arranged generally parallel to one another, wherein each second webbing member of the plurality of second webbing members is offset from an adjacent second webbing member, wherein each of the first webbing members crosses a corresponding one of the second webbing members at a junction point whereat each of the first webbing members is coupled to the corresponding one of the second webbing members, forming a webbing structure having a plurality of junction points between the first and second webbing members;
   an electromagnet secured at the junction point of at least some of the plurality of junction points of the webbing structure; and
   a power source electrically coupled to each electromagnet, the power source operable to power the electromagnet for magnetically coupling the electromagnetic cover to a surface, wherein wiring for electrically coupled each electromagnet to the power source is housed within the internal pathway of the first webbing members.

2. The electromagnetic cover of claim 1, wherein at least some of the second webbing members includes a first webbing layer and a second webbing layer coupled to one another to form a second internal pathway extending therethrough, the second internal pathway housing wiring for coupling the electromagnet to the power source.

3. The electromagnetic cover of claim 1, wherein at least some of the first webbing members further includes a cover formed at a free end of the first webbing member, the cover being movable from a closed position to an open position to expose the internal pathway and provide access to the wiring housed therein.

4. The electromagnetic cover of claim 1, wherein each first webbing member of the plurality of first webbing members further includes a first webbing layer and a second webbing layer coupled to one another to form a first internal pathway extending therethrough, the first internal pathway housing wiring for coupling the electromagnet to the power source, and each second webbing member of the plurality of second webbing members further includes a first webbing layer and a second webbing layer coupled to one another to form a second internal pathway extending therethrough, the second internal pathway housing wiring for coupling the electromagnet to the power source, wherein the first and second internal pathways are in communication with each other.

5. The electromagnetic cover of claim 1, further comprising a reinforcing member attached to both the first webbing member and the second webbing at each junction point of the plurality of junction points of the webbing structure, the reinforcing member providing additional rigidity and support at each junction point.

6. The electromagnetic cover of claim 5, wherein each second webbing member of the plurality of second webbing members further includes a first webbing layer and a second webbing layer coupled to one another, and wherein the reinforcing member is attached to the first webbing member between the respective first webbing layer and the second webbing layer, and wherein the reinforcing member is attached to the second webbing member between the respective first webbing layer and the second webbing layer.

7. The electromagnetic cover of claim 1, wherein at least some of the first webbing members further include:
an end strap including a clip positioned adjacent a free end of the end strap; and
an anchor magnet including an anchor strap, the anchor strap coupled to the clip to couple the anchor magnet to the first webbing member.

8. The electromagnetic cover of claim 7, the end strap further comprising a first webbing portion and a second webbing portion, the first and webbing portions detachably coupled to one another, wherein detaching the first and second webbing portion exposes an internal pathway formed in the first webbing portion for housing wiring of the anchor magnet therein.

9. The electromagnetic cover of claim 7, wherein the anchor magnet further includes a loop handle having a first region raised from a housing thereof, and wherein the anchor strap passes through the first region of the loop handle to couple the anchor magnet to the anchor strap.

10. The electromagnetic cover of claim 7, wherein the anchor magnet further includes an indicator light for communicating a power status of the anchor magnet.

11. The electromagnetic cover of claim 7, wherein the anchor magnet has a stronger magnetic field strength as compared to the electromagnets.

12. The electromagnetic cover of claim 1, further comprising a voltage regulator in operable communication with the power source, the voltage regulator operable to regulate voltage provided from the power source to a predetermined threshold.

13. The electromagnetic cover of claim 1, further comprising a surface material extending over at least a top surface of the first and second webbing members.

14. An electromagnetic cover for securing cargo, the electromagnetic cover comprising:
a plurality of first webbing members arranged generally parallel to one another, wherein each first webbing member of the plurality of first webbing members is offset from an adjacent first webbing member, wherein at least some of the first webbing members includes an end strap with a clip positioned adjacent a free end of the end strap;
a plurality of second webbing members arranged generally parallel to one another, wherein each second webbing member of the plurality of second webbing members is offset from one another, the first webbing members and the second webbing members coupled to one another, forming a webbing structure;
a plurality of electromagnets secured to one of both of the first webbing members and the second webbing members; and
a power source electrically coupled to each electromagnet, the power source operable to power the electromagnet for magnetically coupling the electromagnetic cover to a surface, and
an anchor magnet including an anchor strap, the anchor strap coupled to the clip to couple the anchor magnet to the first webbing member.

15. The electromagnetic cover of claim 14, wherein at least some of the first webbing members includes a first webbing layer and a second webbing layer coupled to one another to form an internal pathway extending therethrough, and wherein wiring for electrically coupling each electromagnet to the power source is housed within the internal pathway of the first webbing members.

16. The electromagnetic cover of claim 15, wherein each of the at least some of the first webbing members further includes a cover formed at a free end of the first webbing member, the cover being movable from a closed position to an open position to expose the internal pathway and provide access to the wiring housed therein.

17. An electromagnetic cover for securing cargo, the electromagnetic cover comprising:
a net frame;
a first ferromagnetic cable coupled to the net frame, the first ferromagnetic cable extending across at least a portion of the net frame;
a second ferromagnetic cable coupled to the net frame, the second ferromagnetic cable extending across at least a portion of the net frame;
a first electromagnet coupled to the first ferromagnetic cable and a second electromagnet coupled to the second ferromagnetic cable; and
a power source electrically coupled to each of the first and the second electromagnets, the power source operable to power the first and second electromagnets, for magnetically coupling the electromagnetic cover to a surface.

18. The electromagnetic cover of claim 17, wherein each of the first and the second electromagnets further comprise a length of conductive wire wound into a coil and wrapped around a portion of the respective first and second ferromagnetic cables.

19. The electromagnetic cover of claim 17, wherein the first and second ferromagnetic cables are arranged in a serpentine pattern across the net frame.

20. The electromagnetic cover of claim 17, further comprising netting material coupled to the net frame, the netting material extending across the net frame and over the first and second ferromagnetic cables.

* * * * *